3,218,348
SEQUENTIAL PREPARATION OF URETHANE-
POLYISOCYANATES
Wilbur R. McElroy and Simon A. D. Visser, New
Martinsville, W. Va., assignors to Mobay Chemical
Company, Pittsburgh, Pa., a corporation of
Delaware
No Drawing. Filed Feb. 23, 1961, Ser. No. 90,956
9 Claims. (Cl. 260—471)

This invention relates to an improved process for the preparation of urethane-polyisocyanates.

Urethane-polyisocyanates are prepared by reacting an excess of an organic diisocyanate with a polyhydric alcohol or mixture of polyhydric alcohols in a solvent. Mixtures of polyhydric alcohols of different functionality based on —OH groups are often used to adjust the number of available —NCO groups remaining in the product. Thus, for example, a mixture of a dihydric and a trihydric alcohol can be reacted with an excess of an organic diisocyanate to prepare urethane-polyisocyanates having three or more free —NCO groups. The use of mixtures of polyhydric alcohols often results in a product which will crystallize out of solution on standing, particularly at high solids concentration of about 65 percent or more. A particular disadvantage of this is that the crystallized material cannot always be redissolved by heating. Furthermore, it is desirable to make concentrated solutions of urethane-polyisocyanates in order to raise the —NCO value of such solutions as high as possible, particularly in cases where the polyisocyanate monomer in solution is substantially absent or at a low value. Such solutions are useful in applications such as surface coatings and adhesives.

It is, therefore, an object of this invention to provide an improved process for the production of high molecular weight urethane-polyisocyanates which will not crystallize from solution on standing for extended periods of time. A further object of this invention is to provide an improved method of making urethane-polyisocyanates in solution from organic diisocyanates, dihydric alcohols and trihydric alcohols. Another object of the invention is to provide improved solutions of urethane-polyisocyanates which can withstand low temperatures.

The foregoing objects and others which will become apparent from the following description are accomplished in accordance with this invention, generally speaking, by providing a process for the preparation of urethane-polyisocyanates in solution in an organic solvent from an organic diisocyanate, a dihydric alcohol and a trihydric alcohol wherein the trihydric alcohol is combined with the organic diisocyanate in a first step and the dihydric alcohol is added to the reaction mixture in a second step. Thus, this invention contemplates an improved method of preparing urethane-polyisocyanate solutions wherein the trihydric alcohol is initially added to the organic diisocyanate in an organic solvent and then the dihydric alcohol is added to the reaction mixture whereby crystallization of the reaction product is avoided.

It has been found that if a dihydric alcohol such as, for example, 1,3-butylene glycol, is added to an organic diisocyanate such as, for example, 2,4-toluylene diisocyanate in an organic solvent and then a trihydric alcohol such as, trimethylol propane is added, the reaction product will crystallize at room temperature. If the dihydric alcohol and trihydric alcohol are added simultaneously to the organic diisocyanate in an organic solvent, the reaction product will crystallize on standing at room temperature for about three days. Further, solutions prepared in this manner will crystallize immediately after preparation at about 10° C. However, in accordance with the process of this invention, if a trihydric alcohol such as trimethylol propane is initially added to the organic diisocyanate, such as 2,4-toluylene diisocyanate in an organic solvent and then a dihydric alcohol such as, 1,3-butylene glycol is added in a second step, separate in time from the first addition and preferably after all of the trihydric alcohol has reacted, the reaction product will remain clear on standing even for extended periods of time of up to six months, a year or even longer at temperatures above about 0° C.

In carrying out the process of the invention, the stoichiometric amount of diisocyanate, based on the hydroxyl groups in both the dihydric and trihydric alcohol, can vary over wide limits but a value of about 75 percent to about 200 percent of the theoretical amount of one mol of diisocyanate per hydroxyl group has proven to be particularly suitable. Since the formation of urethane-polyisocyanates is an exothermic reaction, and since temperatures above about 100° C. may lead to the formation of undesired polymerization products, it is preferred to carry out the reaction at a temperature below about 100° C. For best results, the reaction should be carried out, however, at temperatures above about 20° C. in the interest of speed of reaction. A particularly suitable temperature range is from about 25° C. to about 50° C. It is often advantageous to cool the reaction mixture, and the rate of addition of the trihydric alcohol and dihydric alcohol should be adjusted so that the temperature of the reaction mixture remains within the above-defined ranges.

The proportions of dihydric alcohol to trihydric alcohol is preferably kept within the range of from about 10 weight percent of the former to about 90 weight percent of the latter to about 50 weight percent of the former to about 50 weight percent of the latter. The best results are obtained when amounts within the range of from about 25 weight percent diol:75 weight percent triol to about 35 weight percent diol:65 weight percent triol are used.

Moreover, the reaction is preferably carried out in an inert organic solvent. Any suitable inert organic solvent for the urethane-polyisocyanate may be used such as, for example, ethyl acetate, ethylene glycol monoethyl ether acetate, xylene, mixtures thereof, and the like.

Any suitable trihydric alcohol may be used such as, for example, trimethylol propane, trimethylol ethane, 1,2,4-trihydroxy butane, 1,2,6-hexane triol, 1,3,6-hexane triol and the like. Aliphatic triols having five or six carton atoms are preferred to produce the best stability. Any suitable dihydric alcohol may be used such as, for example, ethylene glycol, propylene glycol, 1,3-butylene glycol, 1,4-butylene glycol, 2,3-butylene glycol, 1,6-hexane diol, neopentyl glycol, 1,7-heptane diol and the like. Aliphatic diols having from three to five carbon atoms are preferred to produce the best stability. Trimethylol propane and 1,3-butylene glycol give the best results.

Any suitable organic diisocyanate including aliphatic, aromatic and heterocyclic diisocyanates may be used. Suitable aliphatic diisocyanates are, for example, ethylene diisocyanate, ethylidene diisocyanate, butane 1,4-diisocyanate and cycloaliphatic diisocyanates such as for example, 1,4-cyclohexylene diisocyanate and the like. Any suitable aromatic diisocyanate may be used such as, for example, 2,4-toluylene diisocyanate, 2,6-toluylene diisocyanate, para-phenylene diisocyanate, meta-phenylene diisocyanate, and the like. Any suitable heterocyclic diisocyanate may be used such as, for example, furfurylidene diisocyanate and the like. Of course, mixtures of the organic diisocyanates may be used. The preferred organic diisocyanates are 2,4- and 2,6-toluylene diisocyanate. The process of the invention is particularly suited to the preparation of urethane-polyisocyanates from substantially pure 2,4-toluylene diisocyanate and mixtures thereof with 2,6-toluylene diisocyanate and preferably up to about 35% 2,6-toluylene diisocyanate.

The urethane-polyisocyanates of the invention offer the advantage that they may be shipped and/or stored at a much lower temperature than heretofore possible. They are useful for the preparation of polyurethane plastics by reaction with polyhydroxyl compounds which can be used for coatings on various substrates including wood, for example.

The invention is further illustrated by the following examples in which the parts are by weight unless otherwise indicated.

*Example 1*

About 81 parts of anhydrous ethyl acetate are placed in a flask equipped with an agitator and a thermometer and about 191 parts of 2,4-toluylene diisocyanate are added thereto. About 35.3 parts of trimethylol propane are then added to the ethyl acetate solution of 2,4-toluylene diisocyanate while cooling the flask at a rate whereby the temperature remains between about 25° C. and about 30° C. the mixture is stirred for about 5 hours at which time it has become a single-phase solution. Then about 15 parts of 1,3-butylene glycol are added gradually at such a rate, with cooling, that the temperature of the reaction mixture remains between about 25° C. and about 30° C. Substantially anhydrous conditions are maintained throughout. The reaction mixture is then stable and will not crystallize at temperatures above about 0° C. On analysis the product has about 13.8 percent —NCO, and only about 4.5 percent monomeric 2,4-toluylene diisocyanate remains.

When the process is repeated except that the trimethylol propane and 1,3-butane diol are mixed and then added as a mixture to the 2,4-toluylene diisocyanate, the reaction product will crystallize on standing at room temperature and will crystallize at temperatures below about 10° C. in less than about two days.

*Example 2*

About 157 parts of anhydrous ethyl acetate are placed in a flask equipped with an agitator and a thermometer and about 185 parts of 2,4-toluylene diisocyanate are added thereto. About 35.3 parts of trimethylol propane are than added to the ethyl acetate solution of 2,4-toluylene diisocyanate while cooling the flask whereby the temperature remains between about 25° C. and about 30° C. After stirring the mixture for about 5 hours it becomes a single-phase solution. Then about 15 parts of 1,3-butylene glycol are added gradually at such a rate that the temperature of the reaction mixture remains between about 25° C. and about 30° C. Substantially anhydrous conditions are maintained throughout. The reaction mixture is then stable and will not crystallize at temperatures above about 0° C. On analysis the product has about 9.5 percent—NCO and only about 1.6 percent monomeric 2,4-toluylene diisocyanate remains.

When the foregoing example is repeated except that the trimethylol propane and 1,3-butylene glycol are mixed and added to the solution of 2,4-toluylene diisocyanate, the resulting product will crystallize at temperatures below about 10° C.

When the 1,3-butylene glycol is added first and the trimethylol propane is added in a second stage, the reaction product will crystallize at room temperature shortly after completion of the reaction.

*Example 3*

About 100 parts of anhydrous ethylene glycol monoethyl ether acetate and about 61 parts of anhydrous xylene are placed in a flask equipped with an agitator and a thermometer and about 191 parts of 2,4-toluylene diisocyanate are added thereto. About 35.3 parts of trimethylol propane are then added to the solution of 2,4-toluylene diisocyanate while cooling the flask whereby the temperature remains between about 25° C. and about 30° C. After stirring the mixture for about 5 hours it becomes a single-phase solution. Then about 18 parts of 1,3-butylene glycol are added gradually at such a rate that the temperature of the reaction mixture remains between about 25° C. and about 30° C. Substantially anhydrous conditions are maintained throughout. The reaction mixture is then stable and will not crystallize at temperatures above about 0° C. On analysis the product has about 9.3 percent—NCO and only about 1.0 percent monomeric 2,4-toluylene diisocyanate remains.

When the foregoing example is repeated except that the trimethylol propane and 1,3-butylene glycol are mixed and added to the solution of 2,4-toluylene diisocyanate, the resulting product will crystallize at temperatures below about 10° C.

When the 1,3-butylene glycol is added first and the trimethylol propane is added in a second stage, the reaction product will crystallize at room temperature shortly after completion of the reaction.

It is to be understood that any other suitable reactant disclosed herein can be substituted for those used in the foregoing examples.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. In a process for the preparation of a urethane-polyisocyanate solution by a process which comprises mixing an organic diisocyanate with a dihydric alcohol and a trihydric alcohol in an inert organic solvent for said urethane polyisocyanate at a temperature from about 20° C. to about 100° C., the improvement which comprises adding a trihydric alcohol to said organic diisocyanate in said solvent in a first stage and adding a dihydric alcohol to said organic diisocyanate-trihydric alcohol reaction product in a second stage separate in time from said first stage.

2. In a process for the preparation of a urethane-polyisocyanate solution by a process which comprises mixing an excess of a toluylene diisocyanate with a dihydric alcohol and a trihydric alcohol in an inert organic solvent for said urethane polyisocyanate at a temperature from about 20° C. to about 100° C., the improvement which comprises adding a trihydric alcohol to said toluylene diisocyanate in said solvent in a first stage and adding a dihydric alcohol to said organic diisocyanate-trihydric alcohol reaction product in a second stage separate in time from said first stage.

3. The process of claim 2 wherein the total solids is in excess of 50 percent by weight.

4. The process of claim 2 wherein said toluylene diisocyanate is 2,4-toluylene diisocyanate.

5. The process of claim 4 wherein the total solids is in excess of 50 percent by weight.

6. The process of claim 2 wherein said toluylene diisocyanate is a mixture of 2,4-toluylene diisocyanate with up to about 35 percent of 2,6-toluylene diisocyanate.

7. The process of claim 2 wherein said dihydric alcohol is trimethylol propane and said dihydric alcohol is 1,3-butylene glycol.

8. The process of claim 2 wherein the proportion of dihydric alcohol to trihydric alcohol is within the range of from about 10 weight percent of the former to about 90 weight percent of the latter to about 50 weight percent of the former to about 50 weight percent of the latter.

9. An improved urethane-polyisocyanate solution obtained by a process which comprises mixing under substantially anhydrous conditions a trihydric alcohol with an organic diisocyanate in an inert organic solvent for said urethane polyisocyanate in a first stage and mixing the product of the first stage with a dihydric alcohol in a second stage separate in time from said first stage while maintaining the temperature of reaction mixture from about 20° C. to about 100° C. throughout.

References Cited by the Examiner

UNITED STATES PATENTS

| | | | |
|---|---|---|---|
| 2,511,544 | 6/1950 | Rinke | 260—77.5 |
| 2,855,421 | 10/1958 | Bunge et al. | 260—77.5 |
| 2,910,381 | 10/1959 | Vogel | 260—77.5 |
| 2,969,386 | 1/1961 | McElroy | 260—471 |
| 3,020,249 | 2/1962 | Curtis | 260—77.5 |

LEON J. BERCOVITZ, *Primary Examiner.*

HAROLD N. BURSTEIN, DONALD E. CZAJA, *Examiners.*